United States Patent
Kolhouse et al.

(10) Patent No.: US 11,859,567 B2
(45) Date of Patent: Jan. 2, 2024

(54) SYSTEMS AND METHODS FOR SKIP-FIRE OPERATION CONTROL

(71) Applicants: CUMMINS INC., Columbus, IN (US); TULA TECHNOLOGY, INC., San Jose, CA (US)

(72) Inventors: J. Steven Kolhouse, Columbus, IN (US); Ross A. Phillips, Columbus, IN (US)

(73) Assignees: Cummins Inc., Columbus, IN (US); Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/952,070

(22) Filed: Sep. 23, 2022

(65) Prior Publication Data

US 2023/0016806 A1 Jan. 19, 2023

Related U.S. Application Data

(63) Continuation of application No. PCT/US2021/023703, filed on Mar. 23, 2021.

(60) Provisional application No. 63/000,841, filed on Mar. 27, 2020.

(51) Int. Cl.
*F02D 17/02* (2006.01)
*F02D 41/00* (2006.01)
*F02D 41/38* (2006.01)

(52) U.S. Cl.
CPC ......... *F02D 17/02* (2013.01); *F02D 41/0087* (2013.01); *F02D 2041/389* (2013.01); *F02D 2200/0606* (2013.01)

(58) Field of Classification Search
CPC .. F02D 17/02; F02D 41/0087; F02D 41/3005; F02D 2041/389; F02D 2200/0614; F02D 2200/0606; Y02T 10/12
USPC ....... 123/435, 481, 406.7; 701/103–105, 111
See application file for complete search history.

(56) References Cited

U.S. PATENT DOCUMENTS

| | | | |
|---|---|---|---|
| 9,677,498 B2 | 6/2017 | Glugla et al. | |
| 10,066,570 B2 | 9/2018 | Morris et al. | |
| 10,125,715 B2 | 11/2018 | Sanborn et al. | |
| 10,184,416 B2 | 1/2019 | Morris et al. | |
| 2018/0149107 A1 | 5/2018 | Morris et al. | |
| 2020/0049046 A1 | 2/2020 | Kuroda et al. | |
| 2020/0072152 A1 | 3/2020 | Luo et al. | |

FOREIGN PATENT DOCUMENTS

WO    WO-2018/152384    8/2018

OTHER PUBLICATIONS

International Search Report and Written Opinion for PCT Application No. PCT/US2021/023703, dated Jul. 27, 2021, 9 pages.

*Primary Examiner* — Hai H Huynh
(74) *Attorney, Agent, or Firm* — Foley & Lardner LLP

(57) ABSTRACT

A method of controlling a skip-fire cylinder deactivation system of an engine system is provided. The method includes a controller deactivating a cylinder of the engine system to operate the engine system in a skip-fire mode. The method further includes determining a temperature of an injector tip nozzle associated with the cylinder and comparing the temperature of the injector tip nozzle to a threshold a temperature. In response to determining that the temperature of the injector tip nozzle is greater than the threshold temperature, the cylinder is activated by the controller.

18 Claims, 3 Drawing Sheets

SYSTEMS AND METHODS FOR SKIP-FIRE OPERATION CONTROL

CROSS-REFERENCE TO RELATED APPLICATION

This application is a continuation of PCT Application No. PCT/US2021/023703, filed Mar. 23, 2021, which claims the benefit of and priority to U.S. Provisional Application No. 63/000,841, filed Mar. 27, 2020, both of which are incorporated herein by reference in their entireties and for all purposes.

TECHNICAL FIELD

The present disclosure relates generally to engine systems with cylinder deactivation.

BACKGROUND

Some vehicles are equipped with cylinder deactivation ("CDA") technology that enables a CDA mode of operation for an engine of the vehicle. CDA refers to the ability to activate and deactivate one or more cylinders of an engine during operation of the engine and vehicle. CDA is typically utilized to conserve fuel by only utilizing a sub-set of the cylinders to power the vehicle. A CDA mode of operation can also be used for other purposes as well, such as, for example, balancing cylinder usage and warming up the engine. However, due to the activation/deactivation of the cylinders of the engine, uneven wear may occur with various parts of the engine system (e.g., the cylinders).

SUMMARY

One embodiment relates to a method of controlling a skip-fire cylinder deactivation system of an engine system. The method includes a controller deactivating a cylinder of the engine system to operate the engine system in a skip-fire mode. The method further includes determining a temperature of an injector tip nozzle associated with the cylinder and comparing the temperature of the injector tip nozzle to a threshold temperature. In response to determining that the temperature of the injector tip nozzle is greater than the threshold temperature, the cylinder is activated.

Another embodiment relates to a method of controlling a skip-fire cylinder deactivation system of an engine system. The method includes a controller deactivating a cylinder of the engine system to operate the engine system in a skip-fire mode. The method further includes determining an amount of static fuel in an injector nozzle associated with a cylinder of the engine system and comparing the amount of static fuel in the injector nozzle to a threshold fluid amount. In response to determining that the amount of static fuel in the injector nozzle is greater than the threshold fluid amount, the cylinder is activated.

Yet another embodiment relates to a method of controlling a skip-fire cylinder deactivation system of an engine system. The method includes a controller deactivating a cylinder of the engine system to operate the engine system in a skip-fire mode. The method further includes determining an amount of lubricant on an injector needle associated with a cylinder of the engine system and comparing the amount of lubricant on the injector needle to a threshold lubricant amount. In response to determining that the amount of lubricant on the injector needle is greater than the threshold lubricant amount, the cylinder is activated.

An additional embodiment relates to a method of controlling a skip-fire cylinder deactivation system of an engine system. The method includes a controller deactivating a cylinder of the engine system to operate the engine system in a skip-fire mode. The method further includes determining a temperature of static fuel in or proximate to an injector nozzle associated with a cylinder of the engine system and comparing the temperature of the static fuel in or proximate to the injector nozzle to a threshold temperature. In response to determining that the temperature of the static fuel in or proximate to the injector nozzle is greater than the threshold temperature, the deactivated cylinder is activated.

A further embodiment relates to a method of controlling a skip-fire cylinder deactivation system of an engine system. The method includes a controller deactivating a cylinder of the engine system to operate the engine system in a skip-fire mode. The method further includes determining a number of skipped injector cycles of the cylinder during the skip-fire mode and comparing the number of skipped injector cycles of the cylinder during the skip-fire mode to a threshold number of skipped injector cycles. In response to determining that the number of skipped injector cycles of the cylinder when in the skip-fire mode is greater than the threshold number of skipped injector cycles, the deactivated cylinder is activated.

Yet another embodiment relates to system, comprising a controller coupled to an engine system. The controller is configured to deactivate a cylinder of the engine system to operate the engine system in a skip-fire mode and determine a characteristic associated with a cylinder of the engine system. The controller is further configured to compare the characteristic to a threshold characteristic, and in response to determining that the characteristic is greater than the threshold characteristic, activate the deactivated cylinder.

DETAILED DESCRIPTION

Figure 1:
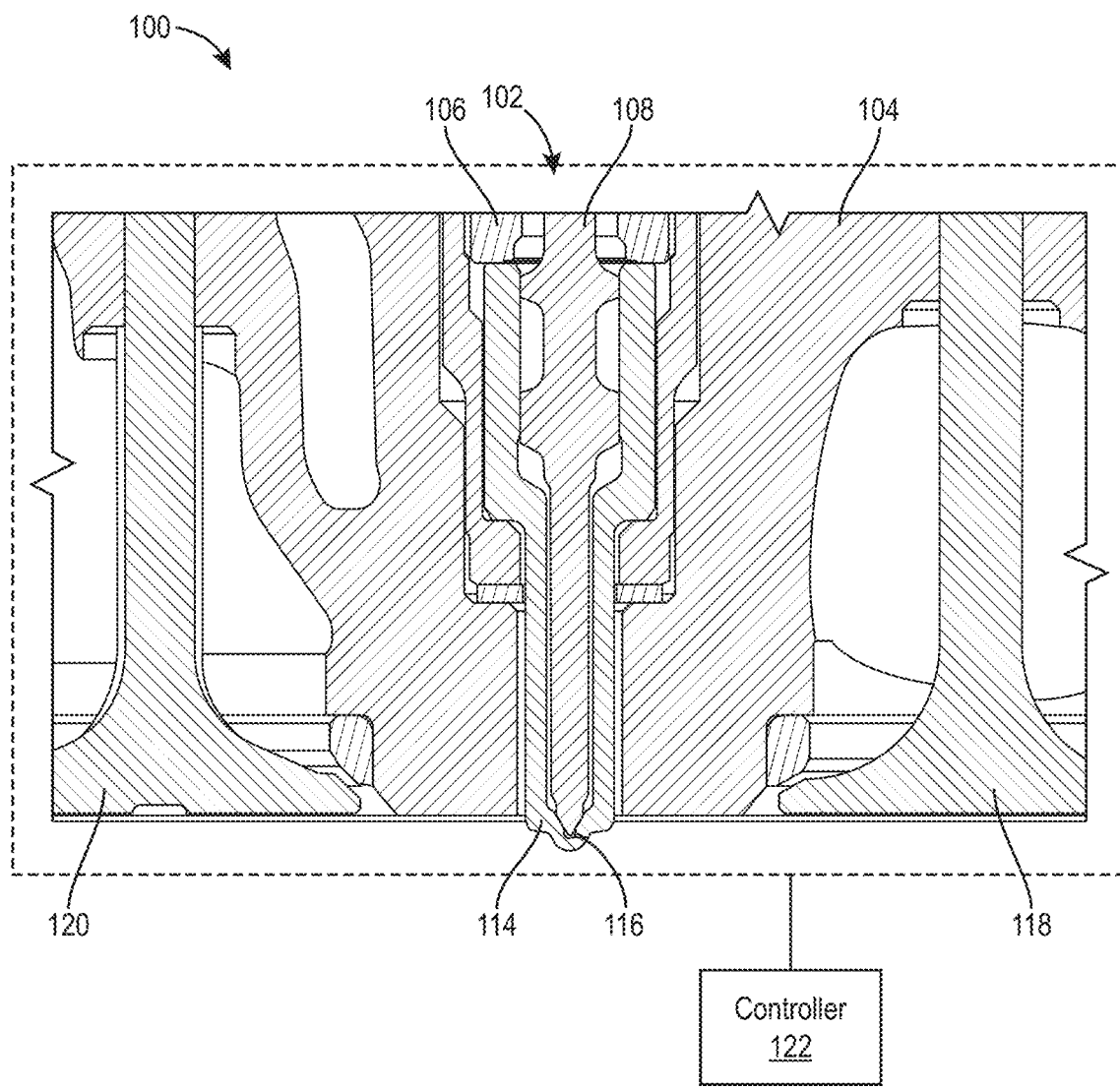
FIG. 1 is an illustration of a controller coupled to a cylinder head for skip-fire CDA operation, according to an exemplary embodiment.

Following below are more detailed descriptions of methods, apparatuses, and systems for modifying skip-fire CDA operation based on various thresholds to maintain operation of an injector associated with a cylinder of an engine system. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

According to the present disclosure, methods, apparatuses, and systems are disclosed that modify skip-fire CDA operation of a cylinder of an engine. During CDA mode, one or more cylinders are deactivated/inactive (i.e., combustion does not occur), such that power from the engine is provided from less than all of the cylinders. In some situations, one or more of the air intake valves may be closed so to not allow air for combustion to flow into the cylinder thereby preventing combustion. In other situations, air may be allowed to flow through the cylinder but combustion is prevented via no spark or diesel fuel injection. Cylinder deactivation mode is a broad term that encompasses various related but distinct cylinder deactivation operating modes. A first type of CDA operating mode is known as "fixed cylinder CDA." In fixed cylinder CDA, the same cylinder(s) are active/inactive each engine cycle during the fixed cylinder CDA operating mode. A second type of CDA operating mode is known as "skip-fire" operating mode. In skip-fire CDA mode, one or more cylinders are deactivated/inactive (e.g., combustion does not occur) on a cycle-by-cycle basis, such that power from the engine is provided from less than all of the cylinders. Accordingly, a cylinder may be inactive for a first engine cycle and active for a second engine cycle. An "active" cylinder means that combustion is allowed to occur in that cylinder. An "inactive" cylinder means that combustion is not allowed to occur in that cylinder. The present disclosure is applicable with each type of CDA operating mode, and the term "skip-fire mode" or "skip-fire CDA mode" is used to indicate herein that each type of operating mode is possible/applicable with the associated concept(s). In contrast and as referred to herein, the term "non-skip-fire mode" is used to refer to operation of the engine where each of the cylinders of the engine are active (able to experience to a combustion event) or the engine is operating in a fixed cylinder CDA mode.

When a cylinder is inactive for an extended period, various complications may arise that impact the operation of the cylinder and engine system overall. The temperature of the tip of the fuel injector may rise to temperatures sufficient to cause coking (e.g., components of fuel and combustion products adhere to the internal surfaces of the fuel injector, causing a clog or decrease in performance). Coking may also be caused by an excessive amount of static fuel and/or a high temperature of static fuel located in the inactive injector. Furthermore, lack of lubrication within the injector may prevent the fuel injector from operating properly when subsequently activated.

According to the present disclosure and as described in more detail herein, a system and method of operating an engine in a CDA operating mode is utilized to avoid the complications described. In operation, various thresholds indicative of performance and/or determined or estimated operating conditions of a fuel injector are utilized to determine whether a potential issue or complication may exist with the fuel injector (e.g., presence of coking, etc.). A controller coupled to the fuel injector may monitor characteristics of the fuel injector and compare those characteristics to the various thresholds. Based on the comparison, the controller may alter/change operation of the CDA mode to prevent a potential complication.

One of the thresholds may include a temperature of the fuel injector tip. If the controller determines that a temperature of the fuel injector tip is greater than a threshold temperature, the controller may activate the cylinder to reduce the temperature of the fuel injector tip. Another threshold may include an amount or temperature of static fuel located in the fuel injector. If the controller determines that the amount or temperature of static fuel located in the fuel injector is greater than a threshold amount or threshold temperature, the controller may activate the cylinder to reduce the amount or temperature of static fuel in or proximate to the injector. Yet another threshold may include a lubrication level of the injector. If the controller determines that the injector has less lubricant than a threshold amount of lubricant, the controller may activate the cylinder to introduce additional lubricant to effectively lubricate the injector. As used herein, the term "lubricant" refers to fuel and/or fuel additives that enhance lubrication for, as an example, the injector needle.

It should be understood that while the description and Figures herein is primarily directed to skip-fire CDA mode that this description is not meant to be limiting. The systems, methods, and apparatuses described herein are also applicable with other CDA operating modes (e.g., fixed cylinder CDA).

Referring now to FIG. 1, an illustration of a controller 122 coupled to a system 100 for skip-fire CDA operation is shown, according to an exemplary embodiment. In one embodiment, this system is implemented in a vehicle. The vehicle may include an on-road or an off-road vehicle including, but not limited to, line-haul trucks, mid-range trucks (e.g., pick-up trucks), cars, boats, tanks, airplanes, locomotives, mining equipment, and any other type of vehicle that may utilize a CDA mode. The vehicle may include a powertrain system, a fueling system, an operator input/output device, one or more additional vehicle subsystems, etc. The vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

While not shown, the system 100 is used with an engine system. The engine of the engine system may be structured as any internal combustion engine (e.g., compression-ignition or spark-ignition), such that it can be powered by any fuel type (e.g., diesel, ethanol, gasoline, etc.). The engine system may include an air intake system and exhaust aftertreatment system. The exhaust aftertreatment system may be configured to treat exhaust gas emissions to obtain more environmentally friendly emissions (e.g., reduce particulate matter or NOx emissions). In some alternate embodiments, the engine system may be used with a hybrid vehicle.

The system 100 is shown to include a cylinder head 104, a fuel injector assembly 102, an intake valve 118, an exhaust valve 120, and the controller 122. As described herein, various thresholds may be used to determine whether to maintain a skip-fire CDA mode or deactivate the skip-fire CDA mode to avoid potential complications of the system 100.

The cylinder head 104 may be located at the top of the engine system (e.g., above the cylinders of the engine system) and provides a housing for various components of the engine system (e.g., the fuel injector assembly 102, the intake valve 118, the exhaust valve 120, sensors such as temperature and fuel sensors, and various other components not shown that may be a part of the engine system). The cylinder head 104 is positioned on top (furthest from ground surface) of a cylinder block. The cylinder head couples to the cylinder block to form a closed cylinder that is a combustion chamber. A piston is disposed in each closed cylinder and reciprocates during operation of the engine.

The intake valve 118 is positioned within the cylinder head 104 and is configured to selectively open to permit air to enter the cylinder and to close to prevent air from entering the cylinder. The exhaust valve 120 is positioned within the cylinder head 104 and is configured to open to permit exhaust gases to exit the cylinder after combustion has occurred. In non-skip-fire mode operation, both the intake valve 118 and the exhaust valve 120 selectively open and close during cylinder cycles to allow air to enter the cylinder, undergo combustion, and direct exhaust gases out of the cylinder. When the engine system is in skip-fire CDA mode, the intake valve may 118 remain closed thereby preventing air from entering the cylinder and being combined with fuel to cause combustion. In some embodiments, the exhaust valve 120 remains closed, as no exhaust gases are present in the cylinder that must be allowed to exit the cylinder. In other embodiments, during skip-fire CDA mode, the intake and exhaust valves are allowed to selectively open and close akin to operation during non-skip-fire CDA mode, but combustion does not occur due to no fuel being injected (compression ignition engines) or a spark being commanded (spark-initiated engines). In these embodiments, air circulates through the deactivated cylinders but does not combust.

The fuel injector assembly 102 is coupled to the cylinder head 104 and is in fluid communication with the cylinder. The fuel injector assembly 102 is configured to deliver, transmit, inject, or otherwise provide fuel to the cylinder for combustion. The fuel injector assembly 102 may include, but is not limited to, an injector body 106, an injector needle 108, an injector nozzle retainer 110, an injector combustion seal member 112, an injector nozzle 114, and an injector nozzle tip 116.

The injector body 106 is an outer housing of the fuel injector assembly 102 and is configured to house and secure the components of the fuel injector assembly 102. The injector needle 108 is sized and configured to fit within the injector nozzle 114 and is sized to occlude the injector nozzle tip 116 when located at the bottom of the injector nozzle 114. The injector needle 108 is operable to move based on electrical signals received by the fuel injector assembly 102. In some embodiments, when fuel is not being injected in to the cylinder associated with the fuel injector assembly 102, the injector needle 108 is in contact with the injector nozzle tip 116 such that the injector needle 108 occludes the injector nozzle tip 116 to prevent fuel from exiting the injector nozzle tip 116. In some embodiments, when fuel is injected into the cylinder associated with the fuel injector assembly 102, an electrical signal may activate various components within the fuel injector assembly 102 to raise the injector needle 108, thereby allowing fuel to flow through the injector nozzle tip 116. To lower the injector needle 108, the electrical signal may be stopped.

The injector nozzle retainer 110 is configured to secure, hold, or otherwise retain the injector nozzle 114 to the injector body 106. The injector nozzle retainer 110 is further configured to contact the injector combustion seal member 112 to create a seal between the fuel injector assembly 102 and the cylinder head 104. The injector combustion seal member 112 may be any type of sealing component configured to maintain a seal between the injector nozzle retainer 110 and the cylinder head 104. Examples of the injector combustion seal member 112 include, but are not limited to, o-rings, washer seals, etc.

The injector nozzle 114 is configured to receive the injector needle 108 and to provide a fuel passage through which fuel flows when fuel is being injected into a cylinder. The injector nozzle 114 extends into the cylinder and terminates at the injector nozzle tip 116, which includes an injector passage in fluid communication with the fuel passage. The injector passage is also in fluid communication with the cylinder so fuel flowing through the fuel passage reaches the injector passage, and eventually flows into the cylinder through the injector passage in preparation for a combustion event.

The controller 122 is coupled to the system 100 and the fuel injector assembly 102 and is configured to at least partly control the operation of the fuel injector assembly 102. The controller 122 is further described with reference to FIG. 2.

Figure 2:
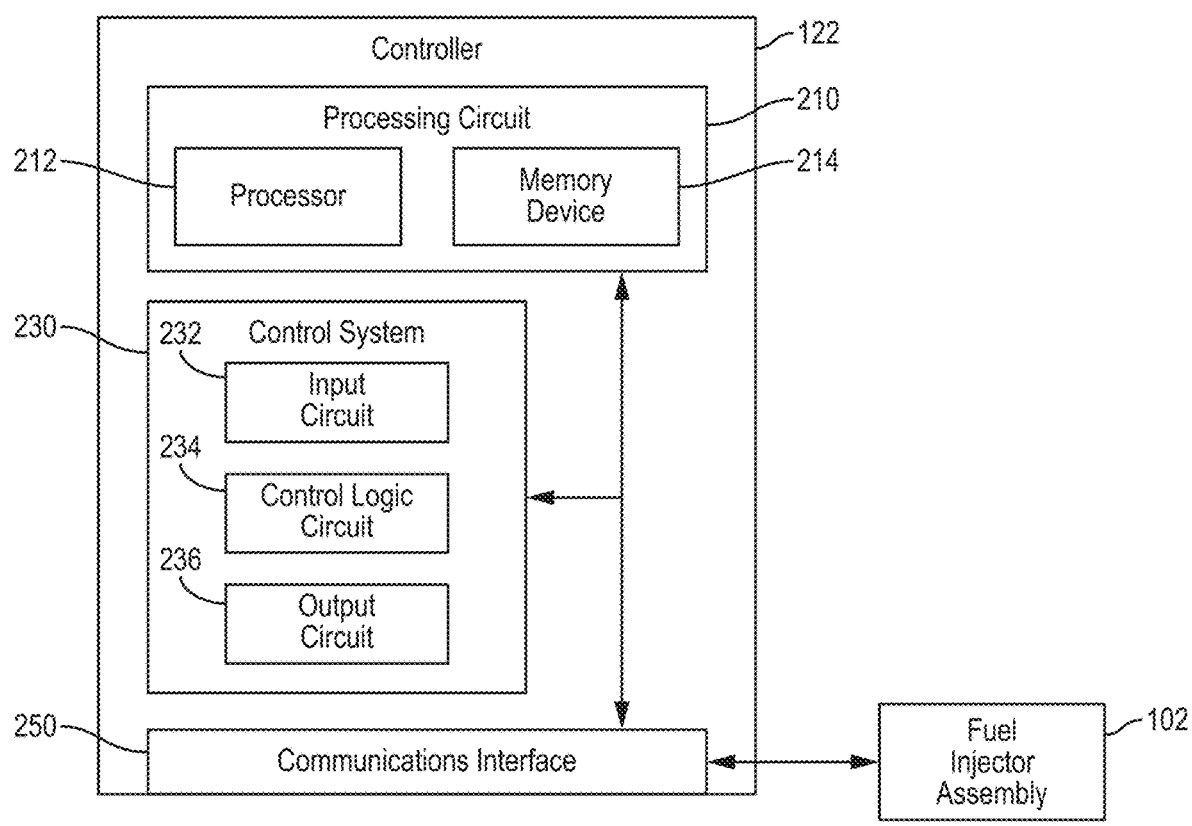
FIG. 2 is a schematic diagram of the controller of FIG. 1, according to an exemplary embodiment.

Referring now to FIG. 2, a schematic diagram of the controller 122 of FIG. 1 is shown, according to an exemplary embodiment. The controller 122 is structured to receive inputs (e.g., signals, information, data, etc.) from the engine system. Thus, the controller 122 is structured to control, at least partly, the fuel injector assembly 102 (and, at least partly, components of the engine system). As the components of FIG. 2 can be embodied in a vehicle, the controller 122 may be structured as one or more electronic control units (ECU). The controller may be separate from or included with at least one of a transmission control unit, an exhaust aftertreatment control unit, a powertrain control module, and engine control module, etc.

As shown, the controller 122 includes a processing circuit 210 having a processor 212 and a memory device 214, a control system 230 having an input circuit 232, a control logic circuit 234, an output circuit 236, and a communications interface 250.

In one configuration, the input circuit 232, the control logic circuit 234, and the output circuit 236 are embodied as machine or computer-readable media that is executable by a processor, such as processor 212 and stored in a memory device, such as memory device 214. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 232, the control logic circuit 234, and the output circuit 236 are embodied as hardware units, such as electronic control units. As such, the input circuit 232, the control logic circuit 234, and the output circuit 236 may be embodied as one or more circuitry components including, but not limited to, processing circuitry, network interfaces, peripheral devices, input devices, output devices, sensors, etc. In some embodiments, the input circuit 232, the control logic circuit 234, and the output circuit 236 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the input circuit 232, the control logic circuit 234, and the output circuit 236 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The input circuit 232, the control logic circuit 234, and the output circuit 236 may also include programmable hardware devices such as field programmable gate arrays, programmable array logic, programmable logic devices or the like. The input circuit 232, the control logic circuit 234, and the output circuit 236 may include one or more memory devices for storing instructions that are executable by the processor(s) of the input circuit 232, the control logic circuit 234, and the output circuit 236. The one or more memory devices and processor(s) may have the same definition as provided below with respect to the memory device 214 and processor 212. In some hardware unit configurations, the input circuit 232, the control logic circuit 234, and the output circuit 236 may be geographically dispersed throughout separate locations in, for example, a vehicle. Alternatively and as shown, the input circuit 232, the control logic circuit 234, and the output circuit 236 may be embodied in or within a single unit/housing, which is shown as the controller 122.

In the example shown, the controller 122 includes the processing circuit 210 having the processor 212 and the memory device 214. The processing circuit 210 may be structured or configured to execute or implement the instructions, commands, and/or control processes described herein with respect to the input circuit 232, the control logic circuit 234, and the output circuit 236. The depicted configuration represents the input circuit 232, the control logic circuit 234, and the output circuit 236 as machine or computer-readable media that may be stored by the memory device. However, as mentioned above, this illustration is not meant to be limiting as the present disclosure contemplates other embodiments where the input circuit 232, the control logic circuit 234, and the output circuit 236, or at least one circuit of the input circuit 232, the control logic circuit 234, and the output circuit 236, is configured as a hardware unit. All such combinations and variations are intended to fall within the scope of the present disclosure.

The processor 212 may be a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Accordingly, the processor 212 may be a microprocessor, a different type of processor, or state machine. The processor 212 also may be implemented as a combination of computing devices, such as a combination of a DSP and a microprocessor, a plurality of microprocessors, one or more microprocessors in conjunction with a DSP core, or any other such configuration. In some embodiments, the processor 212 may two or more processors that may be shared by multiple circuits (e.g., the input circuit 232, the control logic circuit 234, and the output circuit 236 may comprise or otherwise share the same processor which, in some example embodiments, may execute instructions stored, or otherwise accessed, via different areas of memory). Alternatively or additionally, the processors may be structured to perform or otherwise execute certain operations independent of the other co-processors. In other example embodiments, the processors may be coupled via a bus to enable independent, parallel, pipelined, or multi-threaded instruction execution. All such variations are intended to fall within the scope of the present disclosure.

The memory device 214 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 214 may be coupled to the processor 212 to provide computer code or instructions to the processor 212 for executing at least some of the processes described herein. Moreover, the memory device 214 may be or include tangible, non-transient volatile memory or non-volatile memory. Accordingly, the memory device 214 may include database components, object code components, script components, or any other type of information structure for supporting the various activities and information structures described herein.

The input circuit 232 is structured to receive information from one or more fuel injector assemblies (e.g., the fuel injector assembly 102) and/or one or more sensors coupled to the one or more fuel injector assemblies via the communications interface 250. The sensors may include one or more of a temperature sensor (e.g., to determine a temperature of an injector nozzle tip such as the injector nozzle tip 116), a flow sensor (e.g., to determine a flow rate of fuel flowing through a fuel injector assembly such as the fuel injector assembly 102), an optical sensor (e.g., to determine an amount of fuel or lubricant within the fuel injector assembly 102), or any other type of sensor that can provide information related to the operation of a fuel injector assembly. In some arrangements, the information generated by the sensors is sent to the control logic circuit 234 wirelessly (e.g., the sensors include a wireless transmitter to transmit information and the control logic circuit 234 includes a wireless receiver to receive the information). The information generated by the sensors can also be sent to the control logic circuit 234 via a wired connection. The input circuit 232 may modify or format the sensor information (e.g., via analog/digital converter) so that the sensor information can be readily used by the control logic circuit 234. In some embodiments, the sensor information may include the temperature of the injector nozzle tip 116 during skip-fire CDA mode. In some embodiments, the sensor information may include an amount or temperature of static fuel in the injector nozzle 114 during skip-fire CDA mode. In some embodiments, the sensor information may include an amount of lubricant on or proximate to the injector needle 108 and/or a temperature of the lubricant on or proximate to the injector needle 108 during skip-fire CDA mode or at another time (e.g., immediately before activation of skip-fire CDA mode).

The control logic circuit 234 is structured to receive information regarding the fuel injector assembly 102 from the input circuit 232 and to determine skip-fire CDA operation strategy based on the information. For example, the control logic circuit 234 can determine whether the vehicle should operate in skip-fire CDA mode, which cylinders will be fired and which cylinders will be skipped when in skip-fire CDA mode, the number of cycles during which the skip-fire CDA mode will operate, etc. As used herein, "control parameters" refer to values or information determined within the control logic circuit 234 by the embedded control logic, model, algorithm, or other control scheme. The control parameters may include values or information that represents a status or a state of a vehicle system, a predictive state information, or any other values or information used by the control logic circuit 234 to determine what the controller 122 should do or what the outputs should be.

For a skip-fire CDA system, a complex control scheme is needed to balance requirements to meet a requested torque demand at an optimum fuel efficiency, while assuring reliable operation of inactive cylinders after those cylinders are activated. In order to control the technology needed to meet these requirements, "control parameters" are needed to understand the current state of the components and how to adjust the actuators. On a typical modern diesel engine, there are on the order of thirty sensors and fifteen actuators. This includes items like: air handling components, including variable geometry turbochargers, EGR valves, throttles, variable valve actuators, etc.; combustion, including multiple fuel injection events varying in quantity and timing, fuel pressure, etc.; and aftertreatment, including catalyst bed temperatures, stored constituents (like ammonia or particulates), progress towards filling or regeneration of the catalyst, special cleaning events, etc.

In some embodiments, the control logic circuit 234 includes algorithms or traditional control logic (e.g., PIDs, etc.). In some embodiments, the control logic circuit 234 includes modelling architecture for component integration or other model based logic (e.g., physical modelling systems that utilize lookup tables). In some embodiments, the control logic circuit 234 utilizes one or more lookup tables stored on the memory device 214 for determination of the control parameters. In some embodiments, the control logic circuit 234 may include artificial intelligence or machine learning circuits, or fuzzy logic circuits, as desired. In one embodiment, the control logic circuit 234 may receive a request related to a skip-fire CDA mode, and determine a control parameter in the form of activating or deactivating one or more cylinders. In another embodiment, the control logic circuit 234 may receive a request related to a skip-fire CDA mode, and determine a control parameter in the form of one or more thresholds related to characteristics of the fuel injector assembly 102.

The output circuit 236 is structured to receive the control parameters from the control logic circuit 234 and provide outputs in the form of actuation information (e.g., the "output") to the system 100 via the communications interface 250. In some embodiments, the output circuit 236 receives a threshold tip temperature for the injector nozzle tip 116 from the control logic circuit 234 and outputs a signal to the system 100 to activate if the actual tip temperature of the injector nozzle tip 116 is greater than the threshold tip temperature. In some embodiments, the output circuit 236 receives a threshold fuel temperature for the static fuel in the injector nozzle 114 from the control logic circuit 234 and outputs a signal to the system 100 to activate if the actual fuel temperature of the static fuel in the injector nozzle 114 is greater than the threshold fuel temperature. In some embodiments, the output circuit 236 receives a threshold amount of static fuel in the fuel injector assembly 102 from the control logic circuit 234 and outputs a signal to the system 100 to activate if the actual amount of static fuel in the fuel injector assembly 102 is greater than the threshold amount. In some embodiments, the output circuit 236 receives a threshold lubrication amount for the injector needle 108 from the control logic circuit 234 and outputs a signal to the system 100 to activate if the actual lubrication amount of the injector needle 108 is less than the threshold lubrication amount.

According to various embodiments, the actual temperature of the injector nozzle tip 116 may be determined by direct measurement or by proxy based on various operating parameters of the system 100. To measure the actual temperature of the injector nozzle tip 116 via direct measurement, one or more temperature sensors (e.g., thermocouples, etc.) coupled to the controller 122 may be placed in, on, or near the injector nozzle tip 116. To measure the temperature of the injector nozzle tip 116 by proxy (e.g., determined or predicted), the temperature of the injector nozzle tip 116 may be estimated by the controller 122 based on operating parameters such as the number of continuous deactivation cycles (e.g., the number of consecutive cycles during which a particular cylinder is deactivated), the engine speed, the engine torque, and any other parameters associated with the engine system that may indicate the temperature of the injector nozzle tip 116.

When the cylinder associated with the injector nozzle tip 116 is deactivated during skip-fire CDA mode for an extended period of time (e.g., more than a predefined threshold value, such as a time value (e.g., 30 minutes) or a usage value (e.g., 30 engine cycles)), the temperature of the cylinder may continue to steadily increase based on the work being done inside the deactivated cylinder. As the temperature of the cylinder increases, the temperature of the injector nozzle tip 116 may also increase beyond a temperature threshold value (e.g., a temperature greater than approximately three hundred degrees Celsius), which may cause/result in coking of the injector nozzle tip 116. Activating the cylinder when the temperature of the injector nozzle tip 116 is greater than a threshold tip temperature (e.g., approximately three hundred degrees Celsius) may reduce the temperature of the injector nozzle tip 116, thereby preventing coking of the injector nozzle tip 116.

According to various embodiments, the actual temperature of the static fuel in the fuel injector assembly 102 and/or the amount of static fuel in the fuel injector assembly 102 may be determined by direct measurement or by proxy based on various operating parameters of the system 100. To measure the actual temperature of the static fuel via direct measurement, one or more sensors (e.g., thermocouples, etc.) coupled to the controller 122 may be placed in, on, or near the injector nozzle 114. To measure the temperature of the static fuel by proxy (e.g., determined or predicted), the temperature of the static fuel may be estimated by the controller 122 based on operating parameters such as the number of continuous deactivation cycles (e.g., the number of consecutive cycles during which a particular cylinder is deactivated), the engine speed, the engine torque, and any other parameters associated with the engine system that may indicate the temperature of the static fuel in the fuel injector assembly 102.

To measure the amount of static fuel in the fuel injector assembly 102 via direct measurement, one or more sensors (e.g., force sensors, pressure sensors, optical sensors, etc.) coupled to the controller 122 may be placed in, on, or near the injector nozzle 114. To measure the amount of static fuel by proxy (e.g., determined or predicted), the amount of static fuel may be estimated by the controller 122 based on operating parameters such as the number of continuous deactivation cycles (e.g., a known amount of fuel may enter the injector nozzle 114 during each deactivation cycle, causing the amount of static fuel to increase over time), the engine speed, the engine torque, and any other parameters associated with the engine system that may indicate the amount of static fuel in the fuel injector assembly 102.

When the cylinder associated with the fuel injector assembly 102 is deactivated during skip-fire CDA mode, the amount of static fuel in the fuel injector assembly 102 may continue to increase. For example, a known amount of fuel may enter the injector nozzle 114 during each deactivation cycle. In some instances, fuel may continue to enter the injector nozzle 114 during each deactivation cycle if the system 100 is not adequately sealed, causing an unknown amount of fuel to enter the injector nozzle 114 during each deactivation cycle. Furthermore, the temperature of the static fuel in the fuel injector assembly 102 may continue to increase based on the work being done in the deactivated cylinder. Increasing the amount of static fuel and/or the temperature of the static fuel may cause coking of the injector nozzle tip 116. Activating the cylinder when the temperature of the static fuel is above a threshold temperature may reduce the temperature of the static fuel, thereby preventing coking of the injector nozzle tip 116. Furthermore, activating the cylinder when the amount of static fuel is greater than a threshold amount may reduce and/or expel the static fuel, thereby preventing coking of the injector nozzle tip 116.

According to various embodiments, the amount of lubricant on the injector needle 108 may be determined by direct measurement or by proxy based on various operating parameters of the system 100. To measure the actual amount of lubricant on the injector needle 108 via direct measurement, one or more sensors (e.g., optical sensors, flow sensors, etc.) coupled to the controller 122 may be placed on or near the injector needle 108 to detect the amount of lubrication present on the injector needle 108. To measure the amount of lubricant on the injector needle 108 by proxy (e.g., determined or predicted), the amount of lubricant may be estimated by the controller 122 based on operating parameters such as the number of continuous deactivation cycles (e.g., a certain amount of lubricant may be consumed during each deactivation cycle, causing the lubrication level to decrease over time), the engine speed, the engine torque, and any other parameters associated with the engine system that may indicate the amount of lubrication on or near the injector needle 108.

When the cylinder associated with the injector needle 108 is deactivated during skip-fire CDA mode, the lubrication level of the injector needle 108 may change. Because the injector needle 108 moves up and down within the injector nozzle 114 when the cylinder is active, sufficient lubrication must be present on one or both of the injector needle 108 and the injector nozzle 114 to prevent sticking. Sufficient lubrication allows the injector needle 108 to move up and down smoothly to provide for consistent fuel injection into the cylinder. In some embodiments, lubricant may be provided to the injector needle 108 and/or the injector nozzle 114 when the cylinder is active. When the cylinder is deactivated during skip-fire CDA mode, the heat associated with operation of the engine system may cause some of the lubricant to evaporate or evacuate from the assembly thereby leaving less lubricant on the injector needle 108 than desirable for operation of an active cylinder. In addition, lubricant in an inactive cylinder may flow away from the desired surfaces (e.g., the contact points between the injector needle 108 and the injector nozzle 114) such that the amount of lubricant in the desired location is less than the amount necessary for operation of an active cylinder. Having less lubricant than needed for operation of an active cylinder may cause the injector needle 108 to stick within the injector nozzle 114 during operation of an active cylinder, which would prevent fuel from flowing properly into the cylinder and negatively affect the efficiency of the engine system. Furthermore, the heat associated with operation of the engine system when the cylinder is deactivated during skip-fire CDA mode may cause lubricant additives in the fuel (e.g., diesel fuel) to break down (e.g., evaporate, change chemical structure, etc.) over time. Such a breakdown of lubricant additives can cause the properties of the lubricant to change such that the lubricant with broken down additives provides less lubrication than the original lubricant. Activating the cylinder when the amount of lubricant is lower than a threshold level for efficient operation of the engine system, or before the lubricant additives have broken down, may prevent the injector needle 108 from sticking in the injector nozzle 114.

Figure 3:
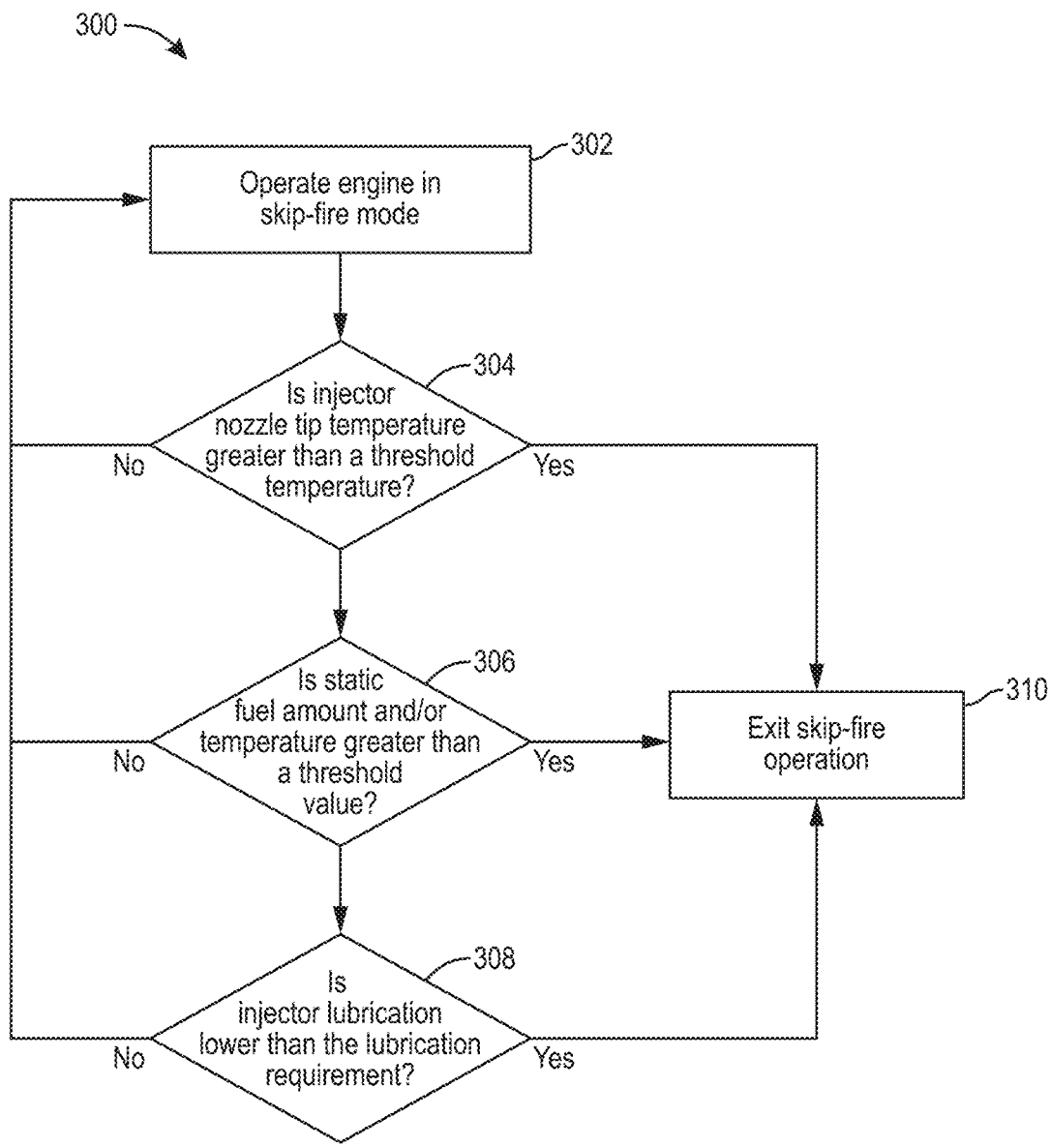
FIG. 3 is a flow diagram of a method to control skip-fire CDA operation of a cylinder, according to an exemplary embodiment.

FIG. 3 is a flow diagram of a method 300 to control skip-fire CDA operation of a cylinder, according to an exemplary embodiment. The method 300 may be implemented, at least in part, by the controller 122 such that reference is made to the controller 122 to aid in explanation of the method 300.

At 302, the engine is operated in skip-fire CDA mode. For example, the vehicle operated by the engine may not require all cylinders to be active for efficient operation (e.g., the vehicle may be traveling on a flat highway at a constant speed). The controller 122 may determine that one or more of the cylinders of the engine can be deactivated to provide for more efficient operation.

At 304, a determination is made as to whether the temperature of the injector nozzle tip 116 is greater than a threshold temperature. For example, as the cylinder associated with the injector nozzle tip 116 remains inactive for consecutive cycles such as engine cycles, the temperature of the injector nozzle tip 116 may increase based on the work being done by the inactive cylinder. The controller 122 compares the actual temperature of the injector nozzle tip 116 to a threshold tip temperature (e.g., approximately three hundred degrees Celsius). If the actual temperature of the injector nozzle tip 116 is lower than the threshold tip temperature, the controller 122 may maintain the cylinder in an inactive state in skip-fire CDA mode at 302. If the actual temperature of the injector nozzle tip 116 is greater than the threshold tip temperature, at 310 the controller 122 may activate the cylinder associated with the injector nozzle tip 116 to exit skip-fire CDA mode for that cylinder. Activating the cylinder associated with the injector nozzle tip 116 may reduce the actual temperature of the injector nozzle tip 116 below the threshold tip temperature, thereby reducing the likelihood of coking of the injector nozzle tip 116 when in skip-fire CDA mode.

At 306, a determination is made as to whether the amount of static fuel in the fuel injector assembly 102 and/or static fuel temperature is greater than a threshold value. For example, as the cylinder associated with the injector nozzle 114 remains inactive for consecutive cycles, the temperature of the static fuel within the injector nozzle 114 may increase. Furthermore, the amount of static fuel within the injector nozzle 114 may increase. The controller 122 may compare the actual temperature of the static fuel within the injector nozzle 114 to a threshold fuel temperature value (e.g., approximately three hundred degrees Celsius). If the actual temperature of the static fuel is lower than the threshold fuel temperature, the controller 122 may maintain the cylinder in an inactive state in skip-fire CDA mode at 302. If the actual temperature of the static fuel is greater than the threshold fuel temperature, at 310 the controller 122 may activate the cylinder associated with the injector nozzle 114 to exit skip-fire CDA mode for that cylinder. Furthermore, the controller 122 may compare the amount (e.g., volume) of static fuel within the injector nozzle 114 to a threshold fuel amount. If the amount of static fuel within the injector nozzle 114 is less than the threshold fuel amount, the controller 122 may maintain the cylinder in an inactive state in skip-fire CDA mode at 302. If the amount of static fuel within the injector nozzle 114 is greater than the threshold fuel amount, at 310 the controller 122 may activate the cylinder associated with the injector nozzle 114 to exit skip-fire mode for that cylinder. Activating the cylinder associated with the injector nozzle 114 may reduce the amount and/or temperature of the static fuel within the injector nozzle 114 below the threshold fuel amount and/or the threshold temperature, thereby reducing the likelihood of coking of the injector nozzle tip 116 when in skip-fire CDA mode.

At 308, a determination is made as to whether the amount of lubricant on the injector needle 108 is lower than a threshold value. For example, as the cylinder associated with the injector needle 108 remains inactive for consecutive cycles, the amount of lubricant on the injector needle 108 may decrease. The controller 122 may compare the amount of lubricant on the injector needle 108 to a threshold lubricant amount. If the actual amount of lubricant on the injector needle 108 is greater than the threshold lubricant amount, the controller 122 may maintain the cylinder in an inactive state in skip-fire CDA mode at 302. If the actual amount of lubricant on the injector needle 108 is less than the threshold lubricant amount, at 310 the controller 122 may activate the cylinder associated with the injector needle 108 to exit skip-fire CDA mode for that cylinder. Activating the cylinder associated with the injector needle 108 when the amount of lubricant drops below the threshold lubricant amount may increase the amount of lubricant on the injector needle 108, thereby reducing the likelihood of suboptimal engine operation due to sticking of the injector needle 108.

In some situations, direct sensing and/or measurement of operating parameters of or relating to a fuel injector may be inapplicable (e.g., if no sensors are in communication with the fuel injector assembly 102). Accordingly, one or more of the injector nozzle tip temperature, static fuel amount and/or temperature, and injector lubrication level may be estimated (or in some embodiments, predicted) based on other parameters associated with operation of a vehicle and components thereof instead of measuring or sensing the parameter values directly. For example, the control logic circuit 234 may include a lookup table that provides correlations between one or more other parameters (e.g., engine torque, engine speed, intake manifold pressure and temperature, etc. and combinations thereof) and one or more of the injector nozzle tip temperature, static fuel amount and/or temperature, and injector lubrication level of the fuel injector assembly 102. The correlations may be based on experimental data, in some instances. The correlations may also be based on mathematical relationships between operating parameters. Thus, in some embodiments, the use of sensed values may be replaced herein with estimated or predicted values using one or more processes, algorithms, etc.

The other parameters may include, for example, parameters such as duration of a skip-fire operation, temperature of ambient air, and a number of skipped cycles such as injector cycles. In situations where the duration of a skip-fire operation is used as an estimate, a longer duration of skip-fire operation may be associated with higher nozzle tip and static fuel temperatures, larger amounts of static fuel, and lower lubrication levels than a shorter duration skip-fire operation. Accordingly, as a duration of a skip-fire operation increases, the likelihood of the control logic circuit 234 modifying the skip-fire operation to manage one or more of the injector nozzle tip temperature, static fuel amount and/or temperature, and injector lubrication level also increases.

In situations where the temperature of the ambient air is used as an estimate, a higher ambient air temperature may be associated with higher nozzle tip and static fuel temperatures, larger amounts of static fuel, and lower lubrication levels than a lower ambient air temperature. Accordingly, as ambient air temperature increases, the likelihood of the control logic circuit 234 modifying the skip-fire operation to manage one or more of the injector nozzle tip temperature, static fuel amount and/or temperature, and injector lubrication level also increases.

In situations where the number of skipped cycles such as injector cycles is used as an estimate, a higher number of skipped injector cycles may be associated with higher nozzle tip and static fuel temperatures, larger amounts of static fuel, and lower lubrication levels than a lower number of cycles. Accordingly, as the number of skipped injector cycles increases, the likelihood of the control logic circuit 234 modifying the skip-fire operation to manage one or more of the injector nozzle tip temperature, static fuel amount and/or temperature, and injector lubrication level also increases. For example, the lookup table may include a threshold number of skipped (e.g., deactivated) injector cycles (e.g., instances when the injector would have injected fuel but for the cylinder being deactivated). The control logic circuit 234 may reactivate one or more deactivated cylinders in response to the preset threshold number of deactivated injector cycles being reached or exceeded.

Though specific examples of other parameters are described as being used to estimate one or more of the injector nozzle tip temperature, static fuel amount and/or temperature, and injector lubrication level, one of ordinary skill would understand that additional parameters may be used for the same purpose. In addition, estimation of one or more of the injector nozzle tip temperature, static fuel amount and/or temperature, and injector lubrication level can be accomplished using a single parameter or a combination of multiple parameters.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2 it should be understood that the controller 122 may include any number of circuits for completing the functions described herein. For example, the activities and functionalities of the circuits 232-236 may be combined in multiple circuits or as a single circuit. Additional circuits with additional functionality may also be included. Further, the controller 122 may further control other activity beyond the scope of the present disclosure.

As mentioned above and in one configuration, the "circuits" may be implemented in machine-readable medium for execution by various types of processors, such as the processor 212 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A method of controlling a skip-fire cylinder deactivation system of an engine system, the method comprising:
    deactivating, by a controller, a cylinder of the engine system to operate the engine system in a skip-fire mode;
    receiving, by the controller, data indicative of a temperature of an injector tip nozzle from one or more sensors in communication with the injector tip nozzle;
    determining, by the controller, the temperature of the injector tip nozzle associated with the cylinder;
    comparing, by the controller, the temperature of the injector tip nozzle to a threshold temperature; and
    in response to determining that the temperature of the injector tip nozzle is greater than the threshold temperature, activating, by the controller, the cylinder.

2. The method of claim 1, further comprising:
    in response to determining that the temperature of the injector tip nozzle is less than the threshold temperature, maintaining, by the controller, the cylinder in a deactivated state.

3. The method of claim 2, further comprising:
    determining, by the controller, the temperature of the injector tip nozzle based on an operating parameter of the engine system.

4. The method of claim 3, wherein the operating parameter of the engine system comprises one or more of a number of deactivation cycles of the engine system, an engine speed, and an engine torque.

5. The method of claim 1, further comprising:
    receiving, by the controller, data indicative of a proxy temperature of the injector tip nozzle from one or more sensors in communication with the engine system; and
    in response to determining that the proxy temperature of the injector tip nozzle is greater than the threshold temperature, activating, by the controller, the cylinder.

6. A method of controlling a skip-fire cylinder deactivation system of an engine system, comprising:
    deactivating, by a controller, a cylinder of the engine system to operate the engine system in a skip-fire mode;
    determining, by the controller, an amount of lubricant on or associated with an injector needle of a cylinder of the engine system;
    comparing, by the controller, the amount of lubricant on or associated with the injector needle to a threshold lubricant amount; and
    in response to determining that the amount of lubricant on or associated with the injector needle is greater than the threshold lubricant amount, activating, by the controller, the cylinder.

7. The method of claim 6, further comprising:
receiving, by the controller, data indicative of the amount of lubricant on or associated with the injector needle from one or more sensors in communication with the injector needle; and
in response to determining that the amount of lubricant on or associated with the injector needle is less than the threshold lubricant amount, maintaining, by the controller, the cylinder in a deactivated state.

8. The method of claim 6, further comprising:
determining, by the controller, the amount of lubricant on or associated with the injector needle based on an operating parameter of the engine system.

9. The method of claim 8, wherein the operating parameter of the engine system comprises one or more of a number of deactivation cycles of the engine system, an engine speed, and an engine torque.

10. The method of claim 6, further comprising:
receiving, by the controller, data indicative of a proxy of the amount of lubricant on or associated with the injector needle from one or more sensors in communication with the injector needle; and
in response to determining that the proxy amount of lubricant on or associated with the injector needle is less than the threshold lubricant amount, maintaining, by the controller, the cylinder in a deactivated state.

11. The system of claim 10, wherein the characteristic is a number of skipped injection cycles of the cylinder during the skip-fire mode, and wherein the threshold characteristic is a threshold number of skipped injection cycles.

12. The system of claim 11, wherein the controller is further configured to:
maintain the cylinder in a deactivated state in response to determining that the number of skipped injection cycles of the cylinder is less than the threshold number of skipped injection cycles.

13. The system of claim 11, wherein the controller is further configured to:
determine the number of skipped injection cycles based on an operating parameter of the engine system, wherein the operating parameter of the engine system comprises one or more of a number of deactivation cycles of the engine system, an engine speed, and an engine torque.

14. A system, comprising:
a controller coupled to an engine system, the controller configured to:
deactivate a cylinder of the engine system to operate the engine system in a skip-fire mode;
determine a characteristic associated with a cylinder of the engine system, wherein the characteristic is an amount of static fuel in or proximate to an injector nozzle;
compare the characteristic to a threshold characteristic, wherein the threshold characteristic is a threshold fluid amount; and
in response to determining that the characteristic is greater than the threshold characteristic, activate the deactivated cylinder.

15. The system of claim 14, wherein the characteristic is a temperature of static fuel in or proximate to an injector nozzle of the engine system and the threshold characteristic is a threshold temperature, and wherein the controller is further configured to:
maintain the cylinder in a deactivated state in response to determining that the temperature of the static fuel in or proximate to the injector nozzle is less than the threshold temperature.

16. The system of claim 15, wherein the controller is further configured to:
determine the temperature of the static fuel in or proximate to the injector nozzle based on an operating parameter of the engine system, wherein the operating parameter of the engine system comprises one or more of a number of deactivation cycles of the engine system, an engine speed, and an engine torque.

17. The system of claim 14, wherein the controller is further configured to:
maintain the cylinder in a deactivated state in response to determining that the amount of static fuel in or proximate to the injector nozzle is less than the threshold fluid amount.

18. The system of claim 14, wherein the controller is further configured to:
determine the amount of static fuel in the injector nozzle based on an operating parameter of the engine system, wherein the operating parameter of the engine system comprises one or more of a number of deactivation cycles of the engine system, an engine speed, and an engine torque.

* * * * *